July 9, 1940.  J. B. McPHERSON, 4TH  2,207,692
CONTROLLABLE RADIO AERIAL
Filed March 23, 1937  2 Sheets-Sheet 1

Inventor
John B. McPherson IV

July 9, 1940. J. B. McPHERSON, 4TH 2,207,692
CONTROLLABLE RADIO AERIAL
Filed March 23, 1937 2 Sheets-Sheet 2
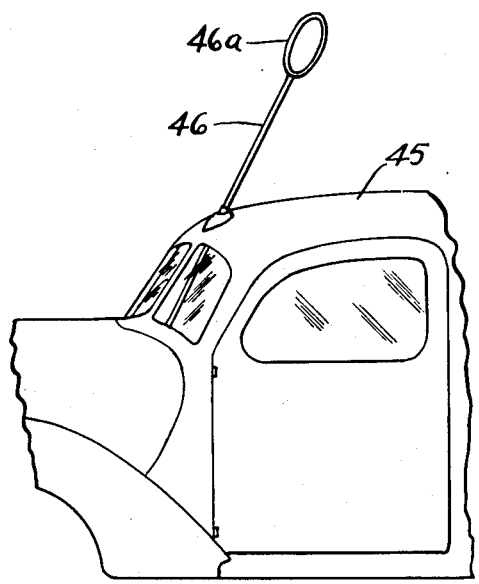
Fig. 5.
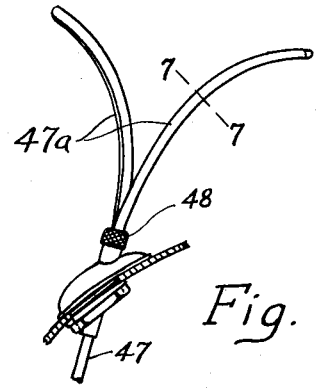
Fig. 6.
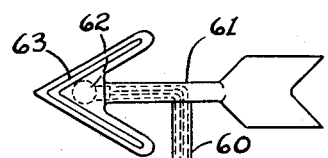
Fig. 7.
Fig. 10.
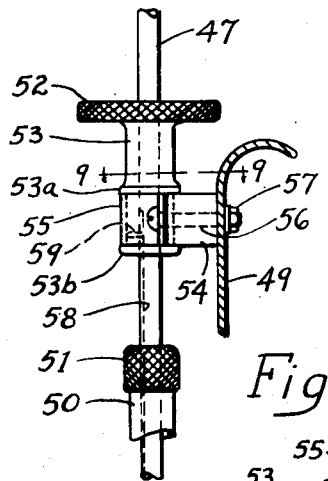
Fig. 8.
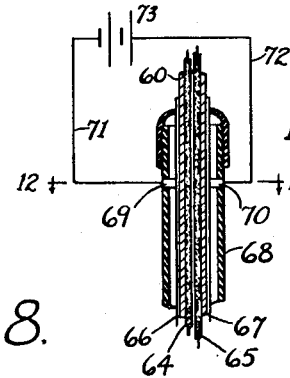
Fig. 11.
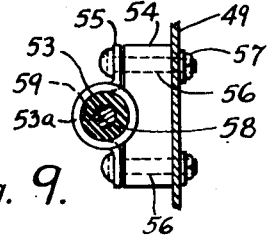
Fig. 9.
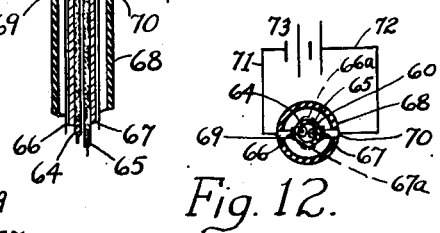
Fig. 12.
Inventor
John B. McPherson IV Patented July 9, 1940

2,207,692

UNITED STATES PATENT OFFICE 2,207,692

CONTROLLABLE RADIO AERIAL

John B. McPherson, IV, Abington, Pa.

Application March 23, 1937, Serial No. 132,472

12 Claims. (Cl. 250—33)

This invention relates to radio aerials and is particularly concerned with aerials for use in conjunction with enclosed occupants' compartments such as are found in automobiles and aircraft.

One of the main objects of the invention is to provide a satisfactory aerial for automobiles which is adapted to extend upwardly through the roof of the vehicle and which may be extended or retracted at the will of the operator from the inside of the vehicle.

Many different forms of aerials for use on automobiles have been produced. Some of those in common use involve rods or tubes which are located substantially parallel to the roof of the vehicle and spaced a short distance therefrom, either in a longitudinal or transverse direction. Such aerials are subject to radio interference due to the metal roof of the vehicle. In addition, they are in view at all times even when not in use and present an undesirable appearance. At the same time they are subject to damage in cases where the vehicle must pass through a space where overhead clearance is limited. It is an object of the present invention to provide an aerial which will eliminate the undesirable features above noted.

In the preferred form of the aerial of the present invention it is made from a metal rod which is flexible and has spring characteristics. This form of construction provides a robust aerial which is not readily damaged upon being struck by an object as would be the case with a thin-walled tube aerial.

An object of the present invention is to provide an aerial which extends upwardly through the roof of the vehicle so as to eliminate interference effects of the roof and at the same time be capable of being withdrawn into the vehicle to eliminate any projecting parts when the radio is not in use. Because the aerial may be retracted when desired it is possible to extend it to a greater height than would be feasible for a fixed aerial. Thus the full sensitivity of the radio set may be utilized.

It is also an object of the invention to provide an aerial which may be used to control the volume of reception by adjusting the amount to which the aerial is extended.

Another object of the invention is to provide an extensible aerial which is simple in construction and inexpensive to manufacture while at the same time providing for improved operating characteristics.

Another object of the invention is to provide an extensible aerial which may be equipped with an apparatus at its upper end which is adjustable to provide for directional reception by rotating the aerial rod.

A further object is to provide an aerial equipped for directional reception which is at the same time capable of being substantially completely withdrawn into the vehicle.

A still further object of the invention is to provide a traffic signalling device which is mounted at the outer end of the aerial rod and in a preferred form may be controlled by rotating the aerial rod from the inside of the vehicle.

In an aerial of the present type it is desirable to maintain a simple form of construction to keep the cost of manufacture low, and at the same time it is necessary that the aerial be adapted for installation under a number of variable conditions. These variable conditions arise because of the necessity for providing a choice of locations in different makes of automobiles. It is an object of the present invention to provide an aerial which is adapted for installation under a large variety of conditions. It is also an object to provide a simple method of insulating the aerial rod from metallic contact with any part of the vehicle. The use of a flexible tube of insulating material to surround the lower end of the aerial rod and in which the aerial rod slides when being extended or retracted assists in accomplishing the last two mentioned objects. This flexible guide tube together with an aerial rod having a considerable degree of flexibility permits curving the lower end of the aerial installation in a fashion to allow its location to be selected to give the least obstruction.

How these and other objects incident to the invention are accomplished will be readily understood from the following description of the drawings in which—

Figure 5 shows an aerial of the selective directional reception type shown in a central location of the automobile.

Figure 6 shows a detailed view of the upper end of a preferred form of the selective directional type aerial.

Figure 7 is a section taken on the line 7—7 of Figure 6.

Figure 8 is a view of the operator's control for a directional type of aerial.

Figure 9 is a sectional view taken on the line 9—9 of Figure 8.

Figure 10 is a view of the upper end of an aerial incorporating a traffic signal device.

Figure 11 shows a somewhat diagrammatic arrangement of the electrical contacts for the device shown in Figure 10.

Figure 12 is a section taken on the line 12—12 of Figure 11.

Figure 1:
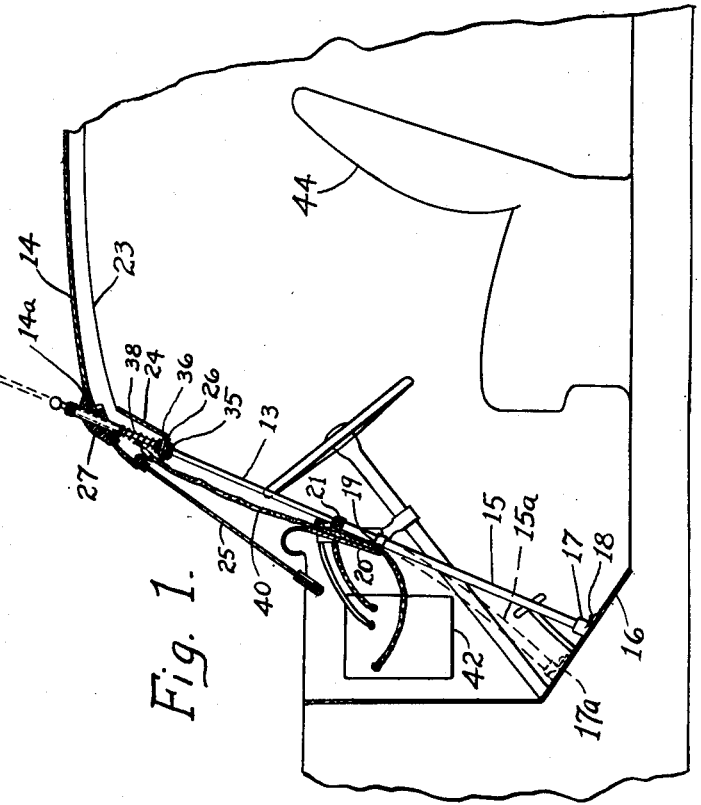
Figure 1 is a view of a preferred form of the aerial showing its arrangement relative to other parts of the vehicle.
Figure 2:
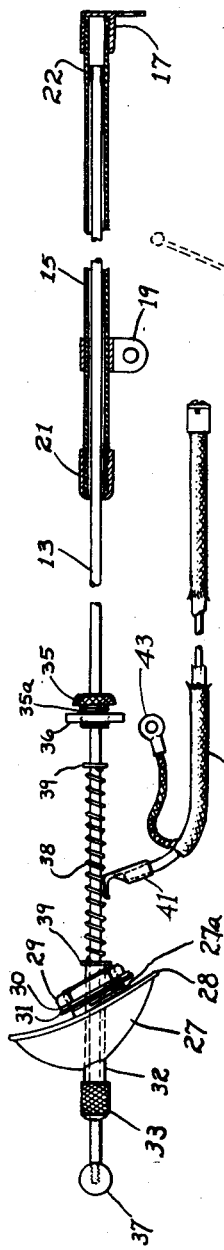
Figure 2 is an enlarged view partly in section showing the detailed parts of the aerial of Figure 1.

The details of construction and method of installation of my extensible aerial will be apparent by reference to Figures 1 to 4 of the drawings. The extensible portion of the aerial is composed of a rod 13 which is made of metal such as steel or hard brass having the desired flexibility and resilience. The aerial rod 13 is installed to project through the roof 14 of the vehicle at a position and angle which provides for a convenient location for the various parts of the aerial with respect to the occupants' compartment. The lower end of the rod 13 is guided in a tube 15 which is made of fiber or other insulating material. The tube 15 is of sufficient length to permit the rod to slide within it a distance at least as great as the amount that the aerial may be extended. The tube 15 is attached to the floor of the vehicle 16 by means of a collar 17 which is fastened to the floor by screw 18. A clip 19 which may be adjusted along the tube 15 to a convenient position supports the upper end of the tube 15 by means of a screw or bolt attached to the instrument board 20 or other convenient supporting element. A ferrule 21 is threaded on to the top end of tube 15 to closely fit around the rod 13. The tube 15 has an inside diameter slightly larger than the outside diameter of rod 13 and collar 22 is fastened to the lower end of the rod 13 to provide a stop which strikes against ferrule 21 in the fully extended position of the aerial.

The inside surface of the top of the vehicle is represented by line 23. In most automobiles a removable panel 24 is provided above the wind shield 25. The aerial is readily installed by removing this panel and drilling the necessary holes 26 and 14a. A molded insulating member 27 is provided to permit the rod 13 to emerge through the roof 14. An effective seal for the hole 14a is assured by the use of a gasket 28 which may be of rubber or other suitable material. The gasket 28 is maintained in close contact with the roof 14 by means of a nut 29, washer 30 and a rubber washer 31. The nut 29 is applied to the threaded projection 27a of the molded member 27.

A tube 32 is embedded at the proper angle in member 27. If desired the member 27 could be moulded to include tube 32 as part of itself. The seal at the upper end of tube 32 can best be seen in Figure 4. A cap 33 is threaded to the top end of tube 32 and is shaped to produce a pressure on packing 34 when screwed down tightly. The cap 33 is knurled to permit ready adjustment. This packing device not only seals the opening through which the rod 13 passes to the open air, but also provides for friction so that the aerial rod 13 will remain in any position to which it is moved by the operator.

To guide and insulate the rod 13 at the hole 26 a bushing 35 of fiber or other insulating material is used. This bushing is provided with thread 35a which engages with a threaded washer or nut part 36 at the opposite side of hole 26 from the head of bushing 35.

A small ball 37 may be attached to the upper end of the aerial rod 13 after assembly to provide a finished appearance and also act as a stop for the retracted position of the aerial by coming in contact with cap 33. Ball 37 is preferably of metal in order to increase the capacity of the aerial.

Figure 3:
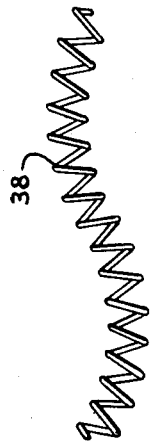
Figure 3 is a view illustrating the special spring which is used to provide a sliding contact.

In the form of the invention shown, a sliding electrical contact is provided by the use of a coiled spring 38 which is arranged to permit the rod 13 to pass axially through it. The spring 38 is shown to larger scale in Figure 3. This spring has an inside diameter slightly greater than the outside diameter of the rod 13. Before assembly, the spring 38 is kinked or bent to produce permanent deformation as indicated in Figure 3 so that when the rod 13 is passed through the spring several points along it provide for the excellent electrical contact. Upon assembly, the spring is compressed somewhat which further increases the pressure, thus assuring a permanent and effective contact regardless of the position of the sliding rod 13. Small washers 39 of insulating material may be used at either end of the spring as a precautionary measure against grounding. A lead 40 provided with terminal 41 which may be soldered to spring 38 connects the aerial with the radio set 42. The wire 40 is preferably shielded and a clip 43 is used to ground the shielding close to the point of connection to the aerial rod.

In Figure 1 the aerial is shown installed at the left hand side of the vehicle within easy reach from the occupant's seat 44. By grasping the aerial rod 13 in the regions between ferrule 21 and bushing 35, the operator is able to move the rod up or down to extend the aerial any amount desired. The dotted lines 13a indicate the aerial in fully extended position.

In certain installations in order to prevent interference of the aerial installation with certain parts of the vehicle or to locate the aerial in a position where it is out of the way, it may be necessary to deflect the lower end of the assembly in a fashion indicated in Figure 1 by dotted lines 15a and 17a. This is readily accomplished with an aerial of the present type since both the fibre tube 15 and the rod 13 may readily be given a considerable degree of curvature without detracting from the operational characteristics of the sliding aerial.

Figure 5 shows a portion of a vehicle 45 equipped with an extensible aerial 46 which is located in the central longitudinal plane of the vehicle. The aerial is shown in the extended position and is equipped with a directional loop 46a at its upper end. By a rotational movement of the aerial rod 46, the loop 46a may be turned to face in any desired direction.

The upper portion of another form of directional aerial is shown in Figure 6. The method of installing this aerial is the same as that in Figure 1. The aerial rod 47, however, is of special construction. The upper end of the rod is split to form two prongs 47a, each of these prongs being a semi-circular cross section as indicated in the section shown in Figure 7. The prongs 47a are bent and tempered in such a manner that upon being extended they tend to spring apart and form a Y shape which gives the aerial its directional characteristics. Upon retracting the aerial the two prongs are brought together through the action of passing through the circular hole in cap 48. It will be seen that by this construction a directional type aerial is provided which may be fully retracted.

Figures 8 and 9 show one form of controlling mechanism which may be used to rotate an extensible aerial having the directional feature. The instrument board of the vehicle is indicated in section at 49. The upper end of the fiber guide tube 50 and ferrule 51 are also shown. A disk-shaped handle 52 having a shank portion 53 and composed of insulating material such as Bakelite is mounted by means of a block 54 and strap member 55. Parts 54 and 55 are assembled by bolts 56 and nuts 57 which provide a clamping action about the lower end of shank portion 53. By adjusting the bolts 56 the proper degree of friction can be introduced so that the handle 52 may be rotated by the operator but will remain in any position at which it is set. The small flanges 53a and 53b prevent axial movement of the handle part 52. The aerial rod 47 extends through a hole in handle part 52 and its shank 53 and can be slid axially through the handle member for extending and retracting the aerial. In order to prevent relative rotation between the aerial rod 47 and the handle 52 a slot 58 is made in the lower part of the rod 47. A small pin 59 projects through the shank portion of the handle into the slot 58 so that upon rotation of handle 52, the aerial rod 47 is also turned. The slot 58 need only extend to a point slightly above the location of pin 59 when the aerial is in retracted position.

Figure 4:
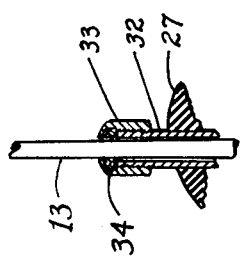
Figure 4 is a sectional view through the packing device.

This arrangement permits the aerial to be readily extended or retracted and at the same time turned to any position selected by the operator. The frictional mounting of handle 52 retains the rod in any position to which it is set until changed by the operator. It will be obvious, of course, that other methods of providing for the rotation of rod 47 may be used. For example, a hexagon-shaped rod might be used with a cooperating hexagon-shaped hole in handle member 52. However, a round section rod is preferred, since it permits the most effective use of a packing device such as shown in Figure 4.

Figures 10, 11 and 12 show one form of a traffic signalling device which may be used in conjunction with an extensible and rotatable aerial. In this form of the invention, the aerial is composed of a heavy walled tube 60, at the top end of which is mounted a signalling device 61 having a shape in the form of an arrow or pointer. The signal is given by the lighting of a light 62 which illuminates the V-shaped slot 63 in the pointer device. In order to operate the signal, the aerial is turned by the operator until the arrow points in the direction in which a turn is to be made. Upon rotation to this position, an electrical contact is made which causes the illumination of the indicating slot 63. After the turn has been completed, the operator rotates the pointer to a straight ahead position which breaks the electrical connection to the lamp 62.

A diagrammatic arrangement for the electrical circuit is indicated in Figures 11 and 12. Wires 64 and 65 lead from the lamp 62 down through the aerial tube 60 and connect at the bottom (connection not shown) to conductors 66 and 67 which are located on the outside of tube 60 at opposite sides of the tube. Conductors 66 and 67 may be of a flat or ribbon shape and insulated from the tube 60 by a thin insulator so that the conductors project only a small distance outside the tube. These external conductors 66 and 67 are carried up the tube a distance approximately equal to the length of the insulating guide tube 68. Near the top of guide tube 68 contacts 69 and 70 are located at opposite sides of the tube to project inwardly a distance sufficient to meet conductors 66 and 67. Contacts 69 and 70 are connected by wires 71 and 72 to the battery 73.

In the positions shown in full lines, the contacts 69 and 70 are in direct connection with conductors 66 and 67, so that the circuit is complete to light the lamp 62. Upon rotation of the aerial tube 60 until the conductors 66 and 67 reach positions 66a and 67a shown by dotted lines in Figure 12, the electrical circuit is broken. It will be evident from the foregoing description of Figures 10, 11 and 12 that when tube 60 is turned approximately 90 degrees from the position shown by 66a and 67a in either direction that the electrical circuit will be completed. In this fashion, a simple method of signalling a right or left turn is provided.

It will be seen that I have developed an unique form of aerial which is adaptable for use under a large variety of conditions and which is simple and robust in construction and effective in operation. The extensible feature of the aerial is accomplished with a minimum of sliding parts and is easily adjusted to various degrees of extension from the inside of the vehicle. By combining the rotational or directional operation with the extensible movement, an aerial having a high degree of controllability is obtained.

I claim:

1. An extensible radio aerial system, including an elongated cylindrical aerial member passing from an enclosed occupant's space to the open air in a generally upright position, an insulating bushing through which said member passes at the point at which it emerges to the open air, an insulating tube into which the lower end of the member telescopes, there being an exposed portion of said member between said bushing and said tube to permit manual extension and retraction.

2. A radio aerial system for a vehicle including and an insulating tube into which the lower end and retracted from the inside of the vehicle, an insulating member supporting said rod at the point where said rod emerges from the vehicle, and an insulating tube into which the lower end of said rod telescopes, said tube having a length at least as great as the distance said rod is capable of being extended and being spaced from said insulating member to leave an exposed length of said rod therebetween.

3. A radio aerial system for a vehicle including an aerial rod which is capable of being extended and retracted from the inside of the vehicle, roof panel having a hole through which said rod emerges, an insulating member surrounding the rod at the hole, said insulating member incorporating a threaded device to seal said hole and a second threaded element to provide a seal between the insulating member and said rod, there being an exposed length of said rod located inwardly with respect to said insulating member to permit said rod to be grasped for extending and retracting.

4. A radio aerial system for a vehicle including an aerial rod having means to permit said rod to be extended, retracted and rotated from the inside of the vehicle, an insulating member for supporting said rod at the point where it emerges from the vehicle, a tubular member into which the lower end of said aerial rod telescopes and a traffic pointer device at the top of said rod, said device being capable of operation by the rotation of said rod.

5. A radio aerial system for a vehicle including an aerial rod having means to prevent said rod to be extended, retracted and rotated from the inside of the vehicle, a tubular member into which said rod telescopes and by means of which said rod is insulated and an indicator at the top of said rod, said indicator having a light and being arranged for rotation through approximately 180° to point either right or left, said indicator being controlled by the rotation of said rod, electrical connections to said light adapted to illuminate said indicator when in either right or left positions regardless of the degree of extension.

6. A radio aerial system for a vehicle including a flexible aerial rod having means to permit said rod to be extended and retracted in a generally upright direction from the inside of the vehicle, an insulating member supporting said rod at the point where said rod emerges from the vehicle, a flexible fiber tube in which one end of said rod telescopes and a lead wire having an electrical connection with said rod which is capable of sliding movement therewith.

7. An extensible radio aerial system for a vehicle including a slidable aerial rod, a combination insulating bushing and seal to permit said rod to extend through the roof of the vehicle, and an insulating guide member to support the lower portion of said rod, there being an exposed length of said rod between said combination bushing and seal and said guide member to permit manual operation of said rod.

8. For a vehicle, an operator's compartment having a windshield at its forward part, a radio aerial system including an extensible rod located in part inside said compartment within reach of the operator, said rod extending through the compartment to the outside at a slope approximating that of said windshield, an insulating member supporting said rod at the point where said rod emerges, and an insulating support for the lower portion of said rod, there being an exposed portion of said rod between said member and said support to permit the operator to slidably adjust the length of said rod which extends outside the vehicle.

9. For a vehicle, an operator's compartment having a windshield at its forward part, a roof curving downwardly to meet said windshield, a radio aerial system including a slidable rod located within reach of the operator and capable of being retracted substantially inside said compartment, said rod extending through the compartment to the outside at a slope approximating that of said windshield and at a point located on the curved portion of said roof whereby said rod makes an acute angle with the surface of said roof, a combined insulating and sealing unit adapted to blend with said surface and to permit said rod to pass therethrough, and a fiber tube supported in said compartment and into which said rod telescopes, there being an exposed portion of said rod between said unit and said tube to permit extension and retraction.

10. A radio aerial system for a vehicle, including an elongated metallic member which is capable of being extended and retracted from the inside of the vehicle, a combination supporting, insulating and sealing assembly surrounding said member to permit it to extend through the roof of the vehicle, said assembly incorporating a threaded element to apply a pressure for effecting a seal between said assembly and the vehicle, a second threaded element to provide a seal between said assembly and said member, and a resilient part cooperating with said second threaded element and contacting said aerial member, there being an exposed length of said member located inwardly with respect to said assembly to permit said member to be manually extended and retracted.

11. An extensible radio aerial system for vehicles including an elongated slidable member, a combination insulating and sealing device to permit said member to extend through the roof of the vehicle, an insulating support for the lower portion of said member, there being an exposed length of said member between said device and said support to permit manual operation thereof, said insulating and sealing device incorporating threaded means for providing a seal between said device and the vehicle and additional threaded means for providing a seal between the device and the aerial member.

12. For a vehicle having an operator's compartment with a wind shield at its forward part, a radio aerial system including an elongated extensible member adapted to be located in part inside said compartment within reach of the operator, said member being capable of extending through the compartment to the outside at a slope approximating that of the wind shield, insulating means for supporting said member at the point where it emerges, insulating and supporting means for the lower portion of said member, there being an exposed portion of said member between said insulating means and said supporting means to permit the operator to slidably adjust the length of said member extending outside the vehicle, and means providing a seal between said insulating means and the vehicle and between said insulating means and said aerial member.

JOHN B. McPHERSON, IV.

CERTIFICATE OF CORRECTION.

Patent No. 2,207,692.                                              July 9, 1940.

JOHN B. McPHERSON, IV.

It is hereby certified that error appears in the printed specification of the above numbered patent requiring correction as follows: Page 3, second column, line 49, claim 2, strike out the words "and an insulating tube into which the lower end" and insert instead --an aerial rod which is capable of being extended--; page 4, first column, line 8, claim 5, for "prevent" read --permit--; and that the said Letters Patent should be read with this correction therein that the same may conform to the record of the case in the Patent Office.

Signed and sealed this 3rd day of September, A. D. 1940.

(Seal)                                                        Henry Van Arsdale,
Acting Commissioner of Patents.